United States Patent [19]
Yoon et al.

[11] Patent Number: 6,031,338
[45] Date of Patent: Feb. 29, 2000

[54] BALLAST METHOD AND APPARATUS AND COUPLING THEREFOR

[75] Inventors: Doo Eui Yoon; Eun Chul Shin; Cheong Bon Han, all of San Jose, Calif.

[73] Assignees: Lumatronix Manufacturing, Inc., San Jose; New Anthony, Inc., San Fernando, both of Calif.

[21] Appl. No.: 08/819,156

[22] Filed: Mar. 17, 1997

[51] Int. Cl.[7] .................................................. H05B 37/02
[52] U.S. Cl. ..................... 315/209 R; 315/307; 315/247; 315/DIG. 7
[58] Field of Search ................................. 315/209 R, 307, 315/205, 291, 308, 247, DIG. 5, DIG. 7; 363/132, 22; 323/207, 222

[56] References Cited

U.S. PATENT DOCUMENTS

| | | | |
|---|---|---|---|
| 4,358,717 | 11/1982 | Elliott | 315/308 |
| 4,463,287 | 7/1984 | Pitel | 315/291 |
| 4,935,862 | 6/1990 | Herbsleb et al. | 363/132 |
| 5,065,074 | 11/1991 | Hesketh et al. | 315/209 R |
| 5,309,066 | 5/1994 | Ditlevsen et al. | 315/205 |
| 5,568,041 | 10/1996 | Hesterman | 323/207 |
| 5,574,336 | 11/1996 | Konopka et al. | 315/225 |
| 5,583,399 | 12/1996 | Rudolph | 315/291 |
| 5,712,536 | 1/1998 | Haas et al. | 315/247 |
| 5,742,134 | 4/1998 | Wacyk et al. | 315/307 |

OTHER PUBLICATIONS

Tape Substrates For Thick Film—Publisher: Kyocera Substrts.

*Primary Examiner*—Haissa Philogene
*Attorney, Agent, or Firm*—Henricks, Slavin & Holmes LP

[57] ABSTRACT

A ballast is disclosed which can operate at an effective level of output with a number of different input voltage levels. A ballast is also disclosed that uses a ceramic as a heat sink for switching transistors. A ballast is further disclosed which uses a start signal for a power factor circuit to boost voltage after the load for the ballast has already had a current applied to it. Furthermore, a ballast is disclosed which has a transformer having a permeability which varies somewhat inversely with temperature over a given temperature range.

18 Claims, 7 Drawing Sheets

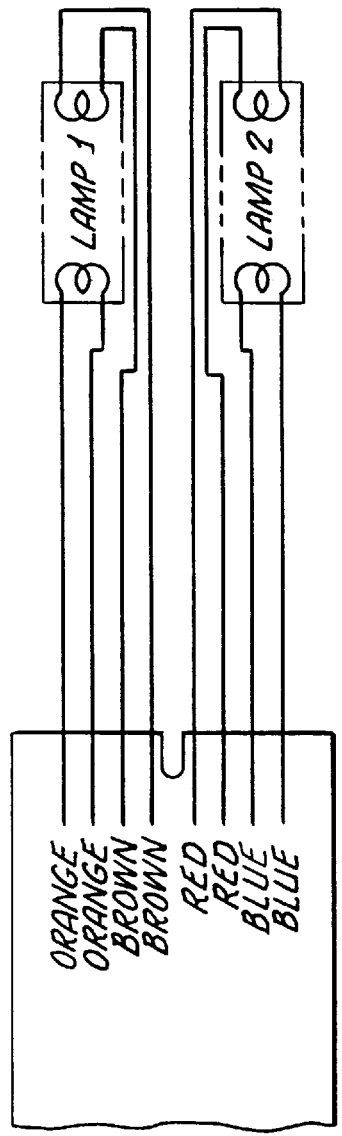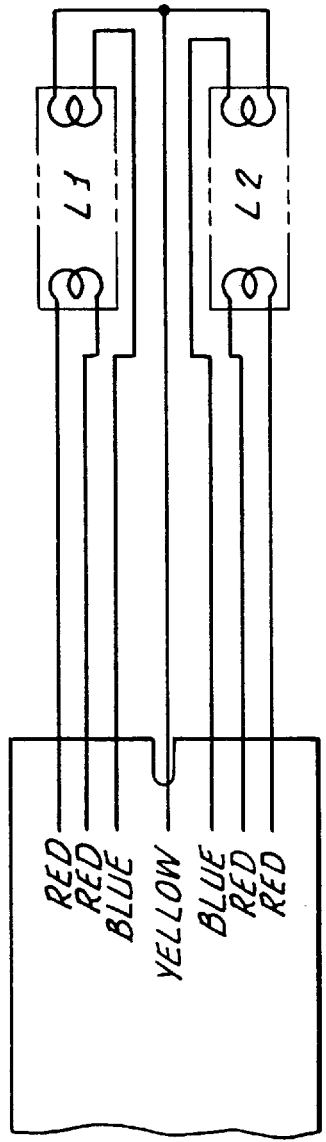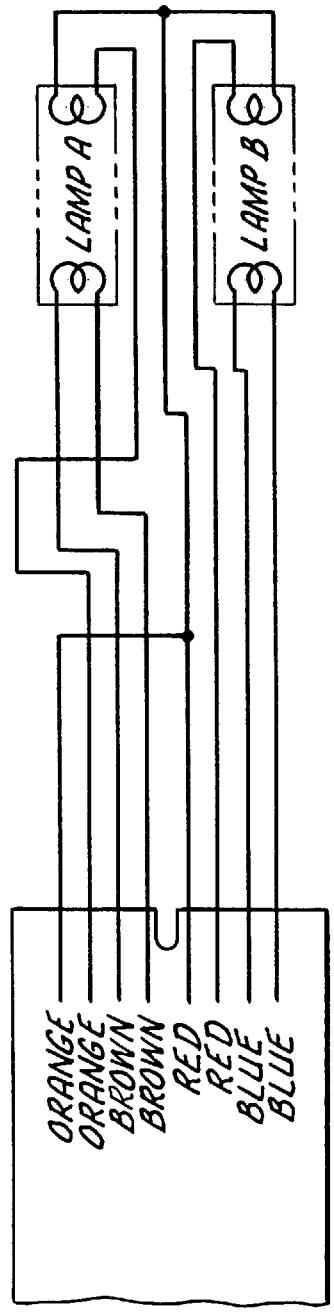

BALLAST METHOD AND APPARATUS AND COUPLING THEREFOR

BACKGROUND OF THE INVENTION

A. Field of the Invention

The present invention relates generally to ballasts for driving fluorescent lamps, and more specifically to methods and apparatus for driving fluorescent lamps and to methods and apparatus for coupling ballasts to lamp circuits.

B. Related Art

Many lighting systems, for example those using fluorescent lamps of the T10 and T12 sizes, use traditional iron core and coil ballasts. These types of ballasts are generally large and generate heat resulting in poor power efficiency. Such ballasts also tend to poorly regulate their output, especially with voltage fluctuations, often causing flicker in the light output. Inadequate output regulation resulting in flicker reduces the quality of the illumination provided by the lighting system. Where lighting systems are used in product display cases, the flicker results in a poorer quality illumination and often causes irritation for viewers.

In low temperature applications, such as in refrigerated display cases, conventional ballasts placed inside a freezer, for example, results in increased power consumption. If the ballast is placed outside the freezer, the ballast reliability decreases. Moreover, such conventional ballasts are typically large in size and difficult to package, transport and install in the limited spaces provided by such display cases.

Lighting systems are often cycled on and off, such as between the times when a store is open and when a store is closed. Ordinarily, start-up of a lighting system applies full voltage to the lamp immediately. This full-on condition places a significant load on the cathode of the lamp, especially when the cathode is at the temperature of a refrigerated display case. This temperature may be either a cooler or a freezer, the cooler operating at less than 10° Celsius, and the freezer operating less than −10° Celsius. This heavy load on the cold cathode results in significantly reduced lamp life, and attendant higher costs of operation.

While some ballasts may operate at a higher driving frequency and a higher driving voltage for the lamp, such higher frequency and voltage produce significant heat and require significant heat dissipation from the ballasts. Because of the heat generated, a larger number of failures may occur if parts prematurely wear out.

Most ballasts have limited ranges of application. If a ballast is intended for one line configuration, such as in the United States at 110 volts and 60 Hertz, or according to the European convention of 220 volts at 50 Hertz, different ballasts are presently supplied according to the required convention. Consequently, large inventories are required to accommodate the variations in requirements, and the operation of any given ballast is often affected by variations in line voltage, such as occurs during normal operation. In the refrigeration cases, fluctuations often occur in line voltage due to starting and stopping of compressors and other equipment. Such fluctuations cause lamp flicker or other non-uniform light output with a concurrent effect on the viewer.

These effects resulting from the use of conventional ballasts lead to shorter lamp lives, inefficiencies in operation, and possibly increased ballast failure. Therefore, improvements in ballast design and operation can be made.

SUMMARY OF THE INVENTION

A ballast is provided which improves ballast efficiency and performance, improves lamp life and is more versatile than conventional ballasts. In one form of the invention, a ballast is provided for driving a light source having an input circuit and an output circuit for driving the light source. In one form of the invention, an operating circuit is provided for the input circuit to allow accepting input voltages of significantly differing values. For example, the ballast can operate at voltages of 110 and 220 volts. The ballast can also operate efficiently and provide the desired light output irrespective of surges or other anomalies in the signal provided to the input circuit.

In another preferred form of the invention, the ballast includes a transformer having a permeability value which varies as a function of temperature. Preferably, the permeability value of the transformer is greater at least some temperatures below zero degrees Celsius, than at some temperatures above 20° Celsius. For example, the permeability of the transformer core may be higher between minus 60 and 0° Celsius than between 20° Celsius to 100° Celsius. This core configuration permits more efficient and reliable operation at lower temperatures while still maintaining the efficient and reliable operation at other temperatures. At some temperatures, the permeability of the core may be one and a half times that at higher temperatures.

In a further form of the invention, switching transistors used in the ballast circuit are mounted to an efficient and reliable heat sink to more effectively dissipate heat generated in the switching transistors. Preferably, the heat sink is a ceramic material having a relatively high purification, without any significant iron or other magnetically inducible elements. Such a heat sink permits operation at relatively high frequencies, which in some cases are more efficient for the light sources being used.

In a further form of the invention, the transformer may be insulated and the windings for the transformer may have an insulation value of at least 100° Celsius, and preferably 200° Celsius. At higher frequencies, and during operation under some conditions, the heat generated in the transformer may be higher than 100° Celsius. Therefore, insulated windings should have insulation values able to withstand significantly higher temperatures.

In a further form of the invention, the ballast includes a power circuit for providing a signal to the light source at a desired voltage, a drive circuit for producing an oscillating signal for driving the light source at the voltage provided by the power circuit, an output circuit for coupling the oscillating signal to the light source, and a signal element for increasing the voltage of operation after start-up. In a preferred embodiment, the signal element is configured to keep the voltage of operation at start-up lower than during normal operation, while thereafter increasing the voltage of operation once the lamp has been illuminated. This signal element permits cold starting by applying a relatively low voltage to the cathode of the lamp under cold conditions and thereafter increasing the voltage applied to the cathode once the lamp has been illuminated. As a result, the higher voltage of operation is not applied to the cathode until such time as the cathode has been heated somewhat. It is believed that this cold starting operation will increase the lamp life, especially during operation in cold environments.

In one form of the invention, the signal element takes the form of a feedback coupling from the lamp driving circuit to the power circuit used to increase the voltage applied to the light sources.

In another form of the invention, a connection arrangement is provided for permitting retrofit of conventional ballast circuits with the new design.

These and other aspects of the invention will be more easily understood by considering the drawings, a brief description of which is provided below, and the detailed description of the preferred embodiments.

BRIEF DESCRIPTION OF THE DRAWINGS

FIGS. 10A–C shows connection circuits and a circuit in FIG. 10C for retrofitting the ballast according to the present invention into circuits using ballasts with seven (7) output connectors.

DETAILED DESCRIPTION OF THE PREFERRED EMBODIMENTS

A ballast is described in accordance with the present invention which provides for a more efficient and reliable operation. The ballast can accept different input voltages and provide consistent output, for example, for driving a lighting system. The output provided is a consistent signal even with variations in input signal voltage. The ballast is more reliable even at higher operating frequencies where significant heat is produced during normal operation. The ballast also operates effectively at reduced environmental temperatures, such as may occur in refrigerated display cases, even down to less than zero degrees Celsius.

Figure 1:
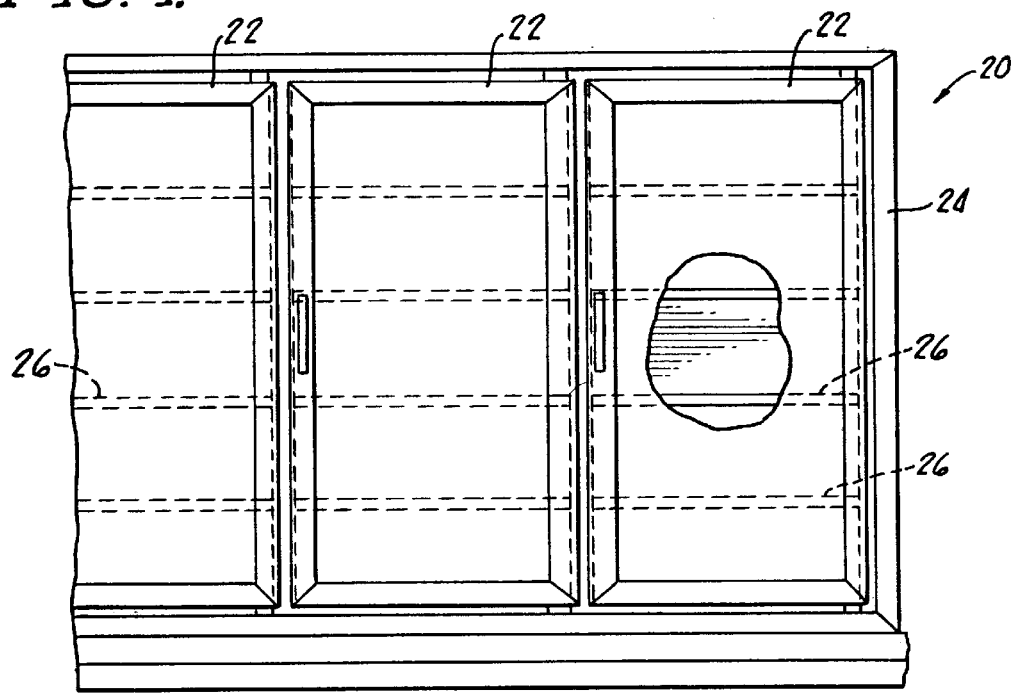
FIG. 1 is a front elevation and schematic view of a refrigerated display case, representing one application for the ballast circuit and connection of the present invention.
Figure 2:
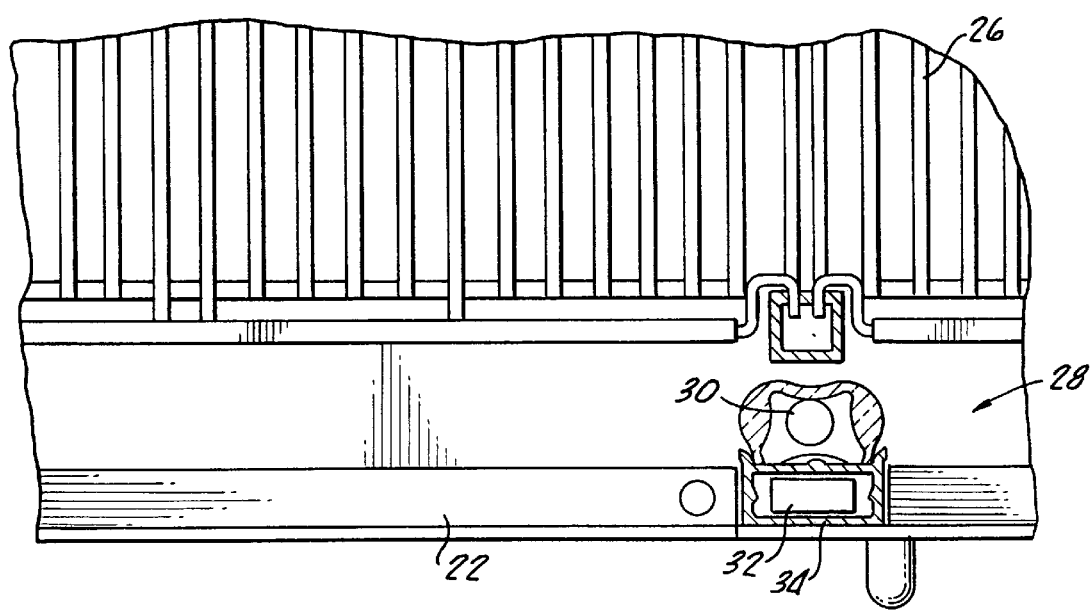
FIG. 2 is a top plan and partial cross sectional view of part of the refrigerated display case of FIG. 1 showing a part of a lighting system for illuminating product on display on shelves in the display case.

In accordance with one aspect of the present invention, the ballast can be used in a refrigerated display case 20 typically including doors 22 set in a surrounding frame 24 for enclosing product (not shown) displayed on shelves 26. Such display cases are commonly found in grocery stores, convenience markets, and the like. As shown in FIG. 2, the display case would include a lighting system 28 for illuminating product stored on the shelves 26 for display. Customers can access and remove product through the doors 22 (shown schematically in FIG. 2). The lighting system typically includes a light source 30, such as a fluorescent lamp having a cathode, an anode, and a discharge gas contained in the tube between the cathode and the anode. A ballast 32 may be positioned inside a mullion 34, or elsewhere in the case to drive the fluorescent lamps. The ballast can be wired in the conventional manner, or may be retrofit to existing seven (7) wire systems, as described more fully below.

The ballast in accordance with one aspect of the present invention includes a lamp output circuit 36, a lamp drive circuit 38 and a power circuit 40 for driving the lamp or lamps in the desired manner, described more fully below. (See FIG. 3.) The lamp output circuit is a conventional circuit including inductors 42 and capacitors 44, and where the inductors 42 are wound in such a way as to provide the desired wattage for the lighting system, given the selected value of the capacitor 46. The capacitor 46 is selected to be relatively large capacitor, such as 0.33 for microfarads, to be used with different values of inductors 42, according the desired wattage output. For example, if the ballast is to operate at 30 watts, the inductors 42 are configured to produce the desired wattage output given the selected capacitor 46. Similarly, with respect to other output wattages, for example 40 and 70 watts.

The drive circuit 38 produces an oscillating signal for driving the lamps at the desired frequency, and also provides a signal output to the power circuit 40 for indicating when the lamp or lamps have begun to be illuminated by the remainder of the ballast circuit. The signal from the drive circuit can be considered a boost signal to indicate to the power circuit that the voltage level for driving the lamps can be increased to the standard operating voltage. The boost signal element is shown at 48 in FIG. 3.

Figure 3:
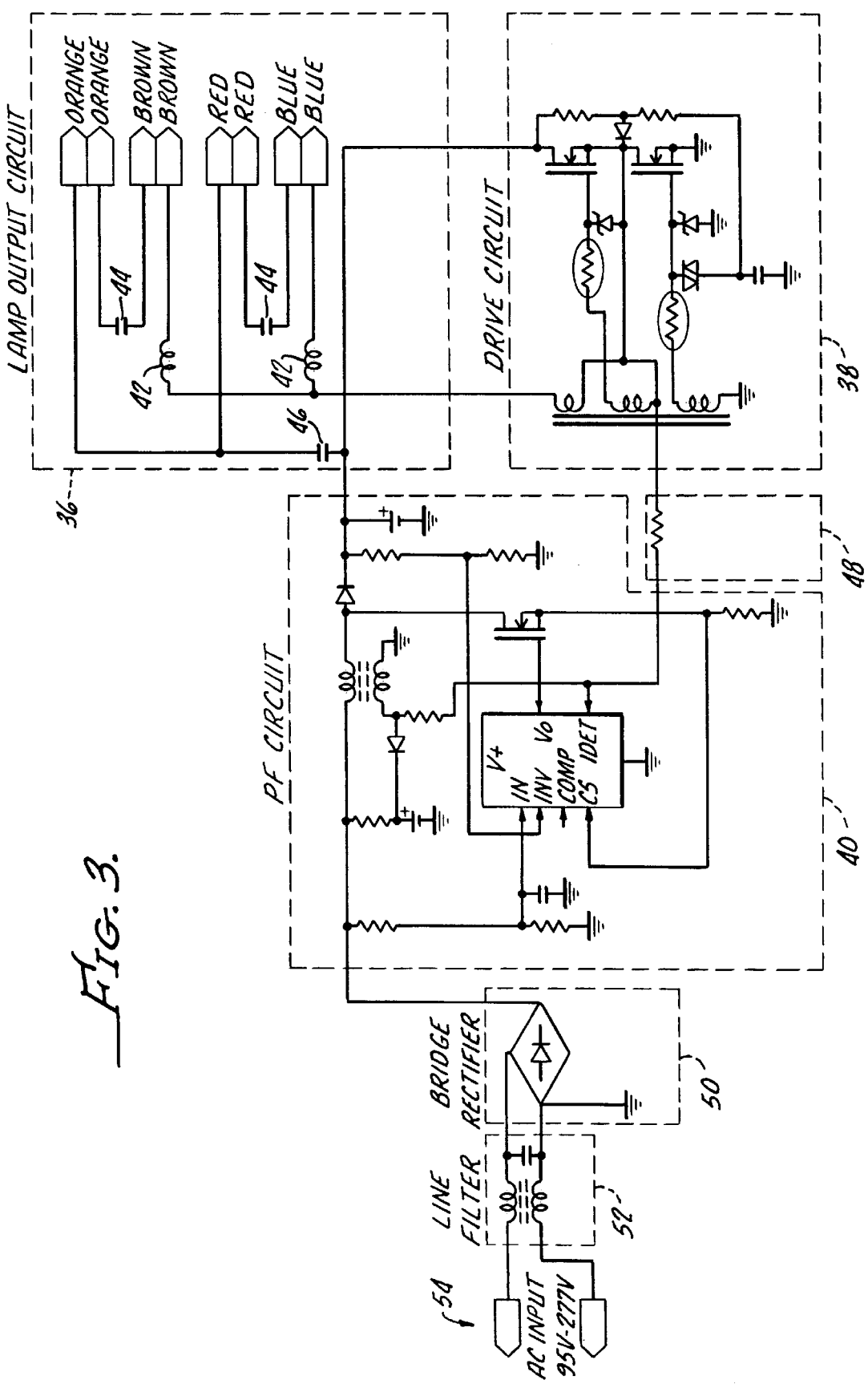
FIG. 3 is a schematic block diagram of the ballast according to one aspect of the present invention.

The power circuit 40 produces a signal at the desired voltage, preferably 360 volts, for driving the lamp output circuit. The power circuit 40 takes a DC voltage signal from a bridge rectifier 50 (FIG. 3), which produces an output voltage based on AC input received from a line filter 52 connected to an AC input 54 and a line protection circuit such as a fuse or circuit breaker. (See FIG. 5.) The line filter 52 includes an inductor transformer T1 56 and a capacitor Cx 58 to reduce or remove any electromagnetic interference which maybe present on the incoming line voltage. As shown in FIG. 3, the ballast of the present invention is capable of accepting input signals of various voltages, including from 95 volts to 277 volts and providing an appropriate output for driving lamps in the desired manner.

A transformer T2 60 includes a primary winding 62 and a secondary winding 64. Transformer T2 60 is a voltage booster controlled by the power correction circuit 64 and by the operation of a power switching transistor, described more fully below. The primary winding 62 passes the voltage signal from the rectifier 50 to the lamp output circuit through diode D2 76 and to the lamp driver circuit to start the lamps. After starting, the transformer 60 boosts the voltage applied to the lamps to 360 volts as desired.

The output of diode 76 is coupled to the positive side of capacitor C12 78, the other side of which is coupled to ground, and to one side of capacitor C14 80, the other side of which is coupled to one pin each 82 and 84 of first and second lamps, respectively. The output of the diode 76 is also coupled to the drain of a switching transistor Q2 86 for producing an oscillating signal for driving the lamps.

The voltage signal from the diode 76 is also coupled to one side of resistor R21 88, the other side of which is connected to the input of a diac D3 90 and to ground through resistor R22 and through a capacitor C13 94 as shown, for starting the lamp circuit, as described more fully below. The other side of resistor 88 is also coupled to a diode 91, the output of which is coupled to the drain of power switching transistor Q3 96 and to the tertiary windings 98 of transformer T3 100. The other side of the tertiary windings 98 is coupled to the input of inductors 42 in the lamp output circuit to drive the output circuit for the lamps. The output of diode 91 is also coupled to one side of the secondary windings 102 of the transformer 100.

The output of diode 91 is also coupled to resistor R11 104 in the boost signal element 48. The other side of resistor 104 is coupled to the current detection port IDET of Ul to signal the power factor circuit that current and voltage are being applied to the lamp circuit. The signal represents an indication to the power factor circuit 126 to boost the voltage being applied to the lamp circuit to the optimum voltage for the lamp circuit. The delay provided between the first receipt of a voltage signal from the bridge rectifier circuit by the lamp output circuit and the time when a boost signal is received from resistor R11 permits cold starting of the lamps at a voltage lower than the normal operating voltage provided by the ballast circuit. Therefore, the full operating voltage from the ballast is not applied to the lamps until such time as the cathodes of the lamps can be started and warmed up slightly, thereby minimizing any undue stress on the cathode until some warming can occur. Thereafter, full voltage can be applied to the lamp circuits. This sequence should enhance the lamp life time.

One side of the secondary 64 of the boost transformer 60 is also coupled to the detection input of the power factor circuit 126 through a resistor R10 108. Resistor 108 keeps the power factor circuit operating after the boost signal is received from the drive circuit.

The other side of secondary windings 102 of transformer 100 is coupled through resistor R16 110 to the gate of switching transistor 86. A zener diode D4 112 is connected across the source of switching transistor 86 and the gate of transistor 86.

The primary windings 114 has one side connected to ground and the other side connected to the gate of switching transistor 96 through resistor R17 116. Resistors 110 and 116 are positive temperature co-efficient resistors used as power switching transistor gate drive resistors. They decrease the resistance at low temperature and increase the resistance at high temperature. At low temperature, the decrease in the resistance of resistors 110 and 116 enable the lamps to produce more output, thus improving the light output. When the lamp temperature increases to their normal operating temperature, resistors 110 and 116 increase their resistance by self-heating, and the output power of the ballast returns to its normal operating level.

Switching transistor 96 has its source coupled to ground, and a zener diode D5 118 is coupled between ground and the gate of switching transistor 96. The diac D3 90 is also coupled between the gate of switching transistor 96 and capacitor 94.

Zener diodes 112 and 118 protect the gates of the power switching transistors 86 and 96 from voltage extremes. Zener diodes 112 and 118 and resistors 110 and 116 serve as a load resistor on the transformer to eliminate spurious high frequency oscillations and to stabilize the output wave forms at the resonant frequency of the load circuit.

Figure 4:
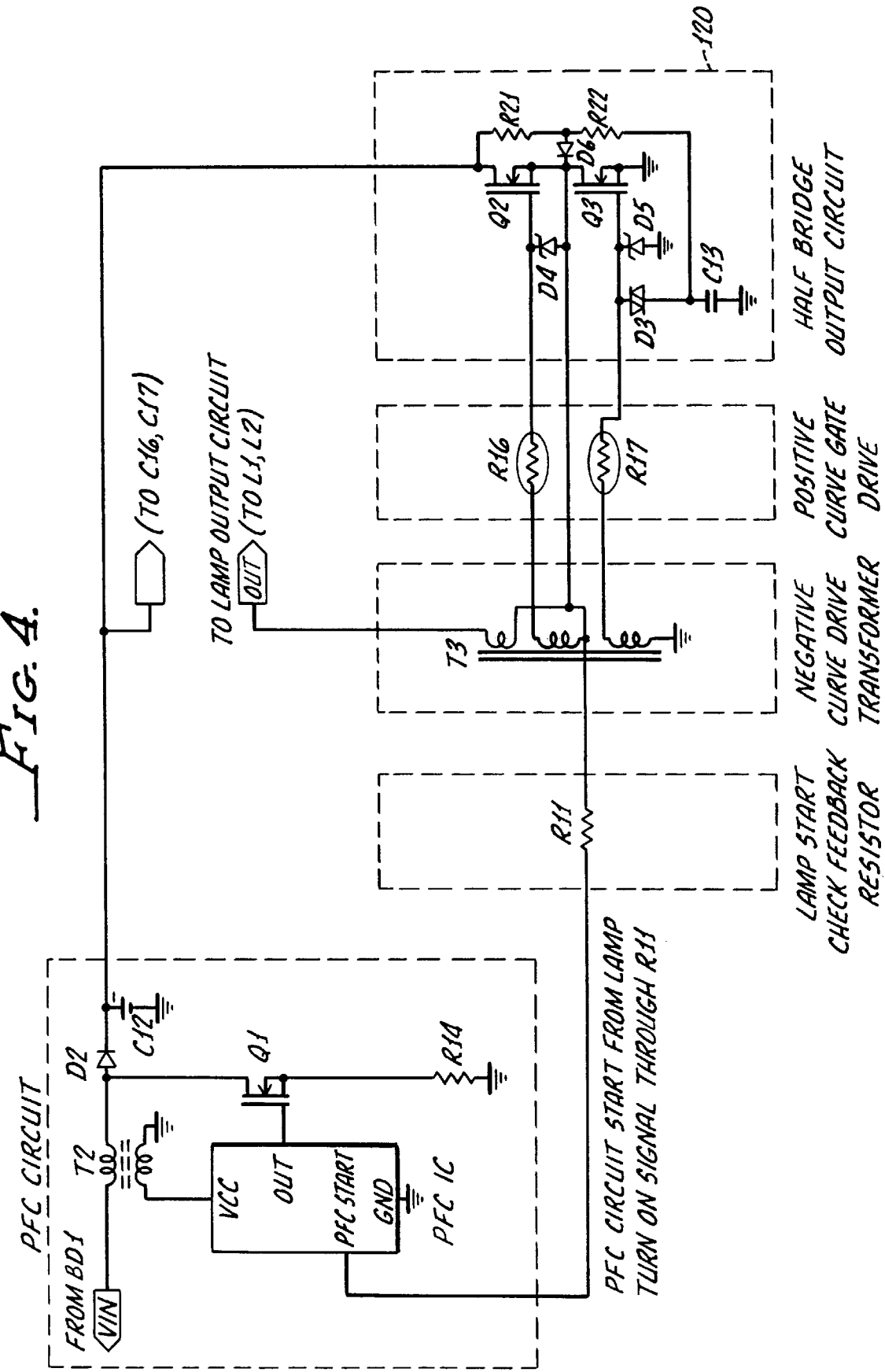
FIG. 4 is a schematic block diagram of a power circuit and lamp driving circuit in accordance with one aspect of the present invention.

Part of the lamp drive circuit is a half-bridge self-resonant converter 120 (see also FIG. 4) for converting the incoming voltage to an oscillating signal, and it includes power switching transistors 86 and 96. Resistors R21, R22, 88 and 92 respectively, and capacitor C13 94 form a start-up charging circuit that reaches the 35 volt break-down of diac 90 in approximately one-half second after power is applied.

The diac 90 begins conducting, producing a positive turn-on voltage pulse applied to the gate of switching transistor 96. With switching transistor 96 turned on, the drain voltage of switching transistor 96 is rapidly switched to ground, thus initiating circuit oscillation. With switching transistor 96 reaching saturation, any charge remaining on capacitor 94 is discharged through diode 91, thereby avoiding any further generation of start-up pulses. The polarities of transformer 100 are chosen so that any alternating current load applied to the half bridge self-resonant converter 120 as a high frequency alternating current output will be driven by a voltage square wave, and load current flowing through the primary of the drive transformer 100 will produce the gate drive voltages for the power switching transistors 86 and 96, causing the circuit to oscillate.

Transformer 100 operates as a current transformer to produce the gate drive voltages, but the resulting wave forms have relatively poor rise and fall times since they are proportional to the sinusoidal load current on the converter 120. The poor rise and fall times of the secondary and tertiary windings provide dead times to prevent potential damage to the power switching transistors 86 and 96 which may result from their simultaneous operation at high frequency.

The lamp driver circuit 38 produces an oscillating signal (80 kHz) to the lamp output circuit. Transformer 100, along with inductors 42 and capacitors 44, ensures that the signals output to the lamps are in phase. Diac 90 provides a trigger signal for starting the oscillations in the lamp driver circuit, and capacitor 94 filters low frequency signals. Diode 91 removes the diac 90 from operation by passing current from resistor 116 through diode 91. Once the converter circuit 120 is started, the driver circuit takes the DC voltage signal from the power circuit 40 and produces the oscillating signal for driving the lamps. Current through the tertiary windings 98 and transformer 100 and through the inductors 42 produce the high voltage to the output to the lamps. The current through the tertiary windings induces current in the secondary windings 102 to charge the gate in switching transistor 86, which then changes the direction of current through inductors 42 based on when switching transistor 96 was charged. The gate for switching transistor 96 was originally charged from current through the diac 90 and passing through the primary 114.

Current through the lamp output circuit through capacitors 80 and 44, through the lamps and back through the inductors 42 to the tertiary windings 98, and through the drain of switching transistor 96 to relative ground through the source, produces the first half cycle of a driving signal. (Once started, the capacitors have little effect on the circuit.) In the next half cycle, capacitor 80 is fully charged and induces current in the secondary windings 102, also through the tertiary windings 98, and charges the gate of switching transistor 86 through gate drive resistor 110. Switching transistor 86 then turns on by current from switching transistor 96 inducing current in the secondary 102, causing capacitor 80 to discharge through switching transistor 86 through the tertiary windings 98 and to the lamp output circuits. Diodes 112 and 118 provide gate protection for the switching transistors 86 and 96.

By sensing the current in the inductors 42 and the capacitors 44, and in the lamps, the drive circuit is forced to operate with the output voltage and the current in phase. Operation in phase ensures optimum operation of the power switching transistors and minimizes switching losses.

In the case where the alternating current load contains a series resonant circuit with capacitor 80 and inductors 42 and the lamp, the lamp voltage wave form will be a sine wave. After the lamp starts, the arc voltage determines the load tuning capacitor-voltage. Because the Q value of the tuned circuit is greatly reduced by the lamp loading, and after the lamp starts, the resonant current decreases so that in normal operation the lamp approximates a constant voltage alternating signal load driven by a series inductor to provide a current limiting function. The circuit is resonant as determined by the lamp sinusoidal voltage. The resonant ballast design maintains luminous output longer for a given lamp life by supplying additional lamp voltage to the lamps to offset any normal wear which ordinarily would reduce lamp output. As a result, replacement of lamps is required less often.

Figure 5:
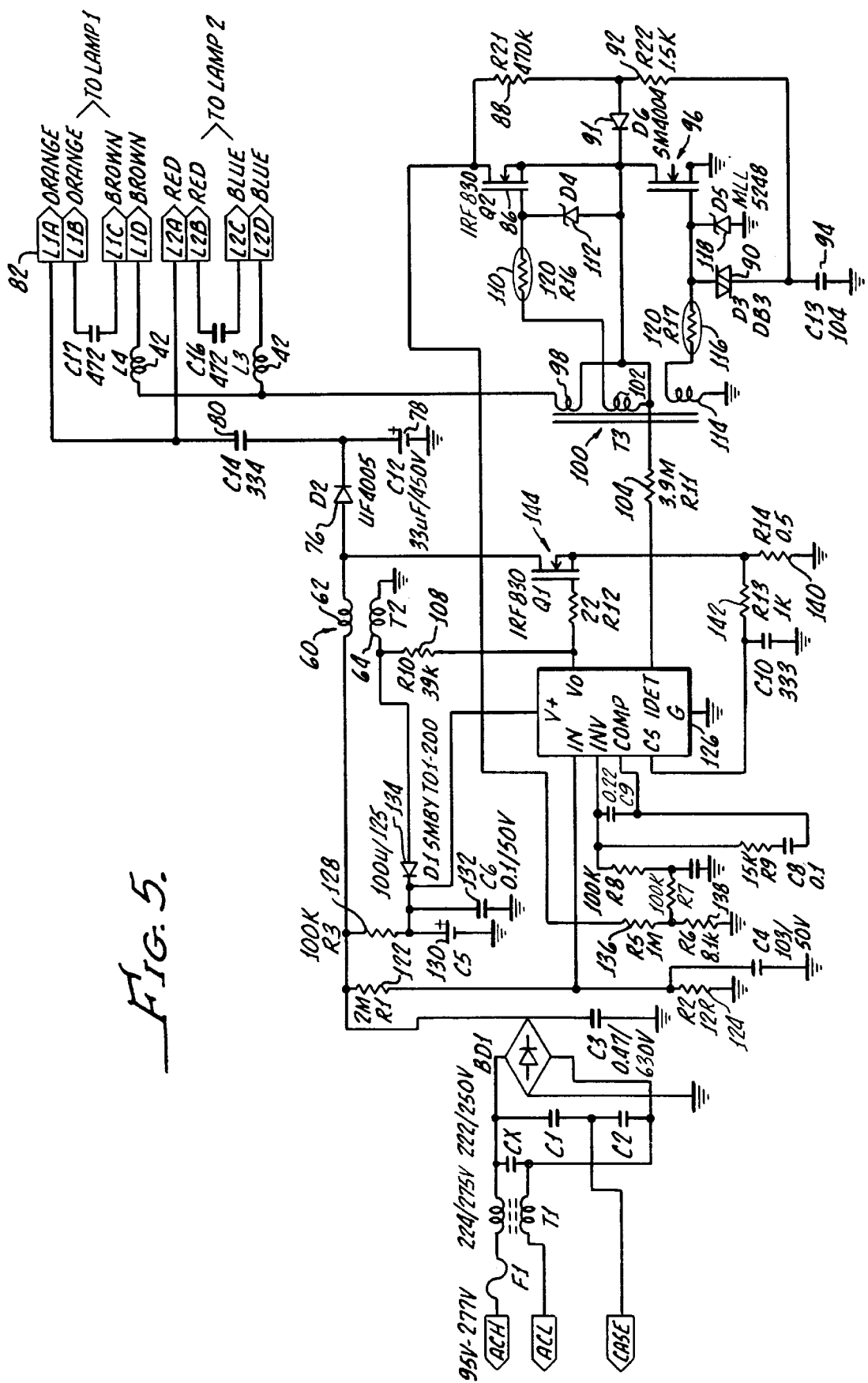
FIG. 5 is a detailed circuit diagram showing the ballast circuit in accordance with one aspect of the present invention.

Considering the power circuit 40 in more detail with respect to FIG. 5, resistor R1 122, and resistor R2 124 form a voltage divider for the input to a power factor circuit U1 126. Resistor R3 128, capacitors C5 130 and C6 132 provide a supply voltage input to the power factor circuit 126.

A primary function of the power circuit 40 is to provide power factor correction, and it also permits operation over a number of input voltages in order to produce an output of 360 volts consistently. The voltage input signal for the power circuit 40 is filtered by capacitor C5 130 through resistor 128, which provides a voltage drop. Once the power circuit is turned on, the power factor circuit voltage is no longer supplied through resistor R3, but is instead received through transformer 60 from the secondary 64, switching diode D1 134 and capacitor 130.

The input voltage $V_{IN}$ is supplied by resistors 122 and 124 as a voltage divider network to give a signal to the power factor circuit 126 as a function of the voltage input to the ballast.

The circuit from the secondary of the transformer 60 synchronizes the phase and wave form with the supply voltage supplied to the input of the power circuit 40. The voltage signal is also supplied to the internal multiplier circuit of the power circuit 40. The voltage divided by resistors R5 and R6, 136 and 138, respectively, is provided to the inverting input of the power circuit 40, which is an error amplifier circuit. The power factor circuit 126 monitors the voltage signal applied to the inverting input and increases the boost transformer output voltage if the voltage level sensed at the inverting input is low, and increases it to a lesser extent if the input is higher.

The voltage signals applied to the voltage input, and to the inverting input, control the peak inductor current in transformer T2 60 by turning the power transistor Q1 off at a threshold. That threshold is determined by the voltage sensed at resistor R14 140, which voltage is supplied through R13 142 to the CS input to the power circuit 40. Reaching the threshold causes the power switching transistor Q1 144 to latch off until the current in the inductor of transformer 60 drops to zero. Thereafter, the secondary winding of the boost transformer 60 changes its voltage polarity and the transition is detected by an internal comparator stage in the power factor circuit 126. The polarity of the windings in transformer 60 are chosen such that low current signals turn on the power transistor Q1 144 and maintain operation until the process repeats itself. Power switching transistor Q1 144 provides for an approximately 99% power factor and also a multiple voltage capability. The transistor operates with the most effect at lower voltages and less so at higher voltages.

An external trigger voltage is applied to the IDET input as described herein. The power factor circuit 126 increases the voltage approximately two to three times that of the input voltage. By delaying the increase in the voltage until after the external trigger is applied, for example after the lamp is turned on, stress to the cathode of the lamp will be reduced since the output voltage is reduced by over 15%.

The inputs to $V_{IN}$, to the inverting input, and to the trigger signal input to IDET, control the power factor circuit 126. The output voltage from the power factor circuit 126, coming from $V_O$, is rectified by switching diode 76 and filtered by capacitor C12 78 and then supplied to the lamp output through the lamp drive circuit.

Figure 9:
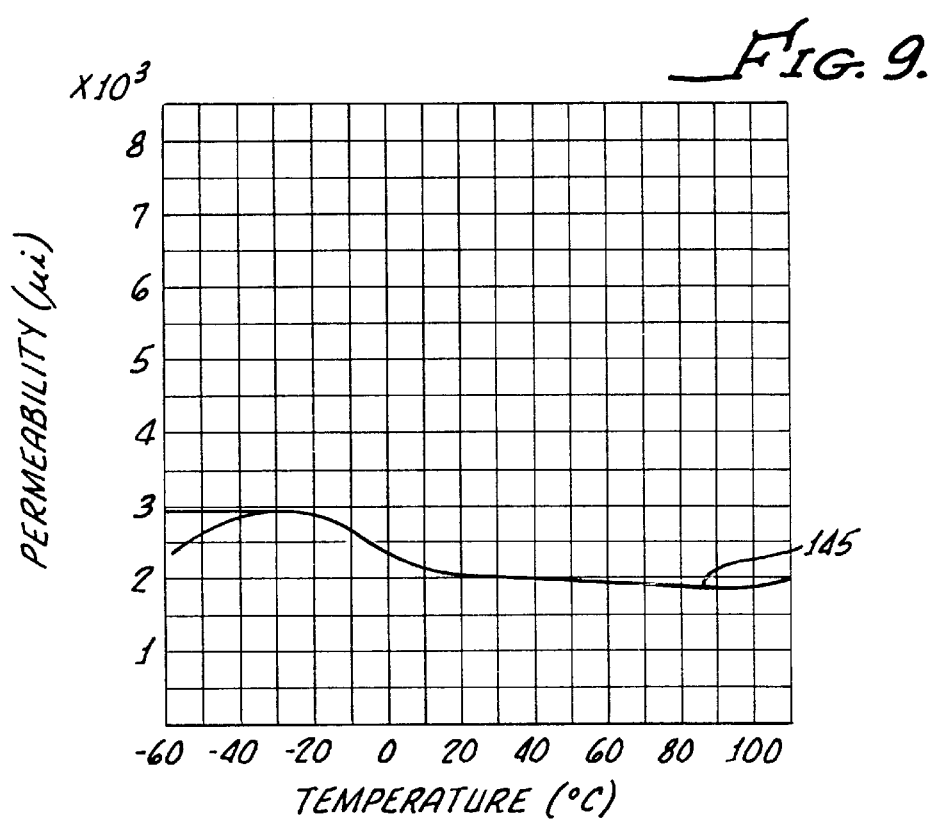
FIG. 9 is a curve showing the permeability of the core of the transformer of FIG. 8 in accordance with one aspect of the present invention.

The transformer 100 is supplied by ISU Ceramics Co., Ltd. of Seoul, South Korea. The transformer is formed and produced with titanium and tin to increase the permeability of the core at low temperatures, and increased amounts of ferrous oxide are provided to increase the permeability at low temperatures as well. The core is produced to have the permeability curve shown in FIG. 9.

The transformer is configured to have five turns on the primary winding, five turns on the secondary and one turn on the tertiary winding. The windings are all rated at 600 volts and 28 gauge wire insulated up to 200° Celsius.

Figure 6:
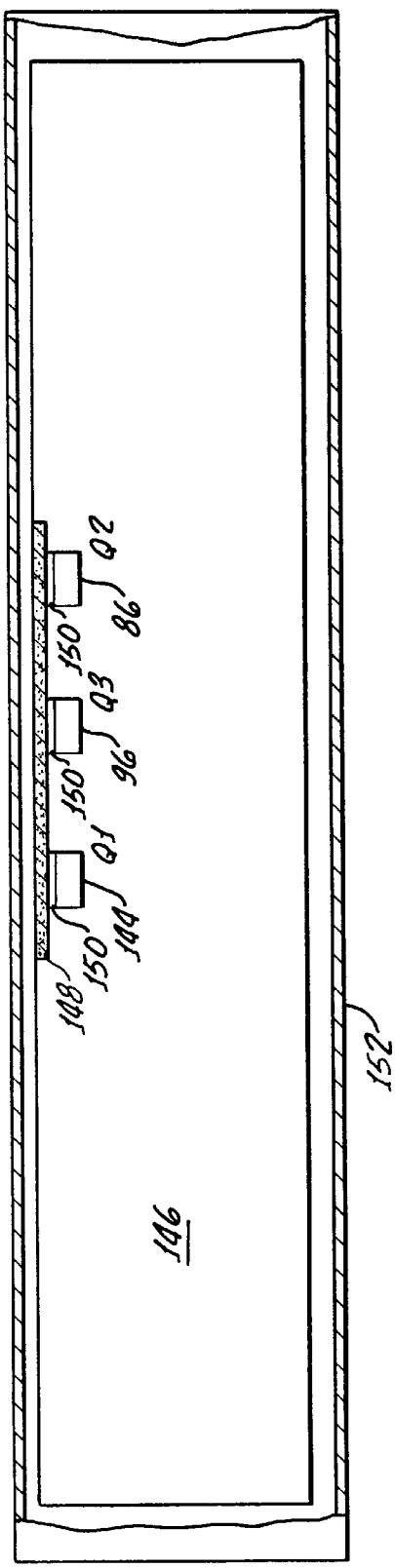
FIG. 6 is a schematic drawing showing a heat sink and transistors mounted on a printed circuit board in accordance with one aspect of the present invention.
Figure 7:
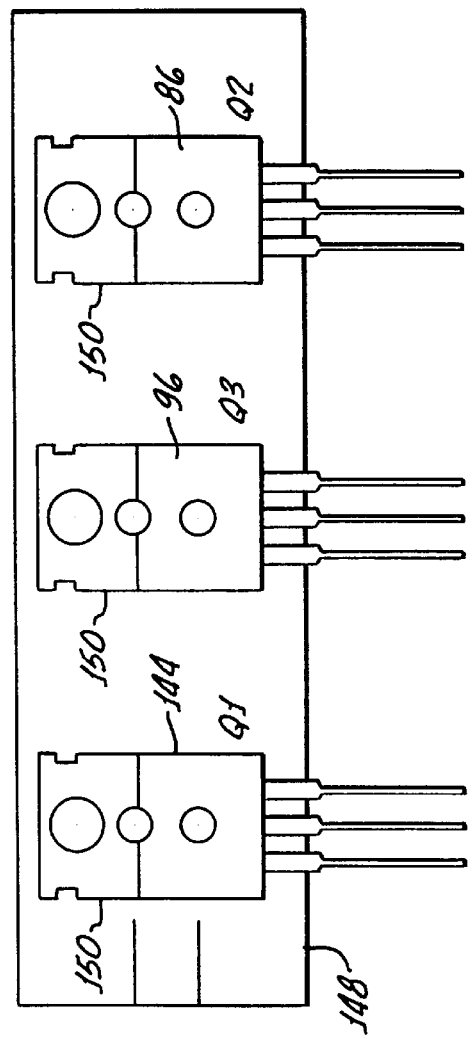
FIG. 7 is an elevation view of the ceramic and switching transistors mounted to the ceramic in accordance with one aspect of the present invention.
Figure 8:
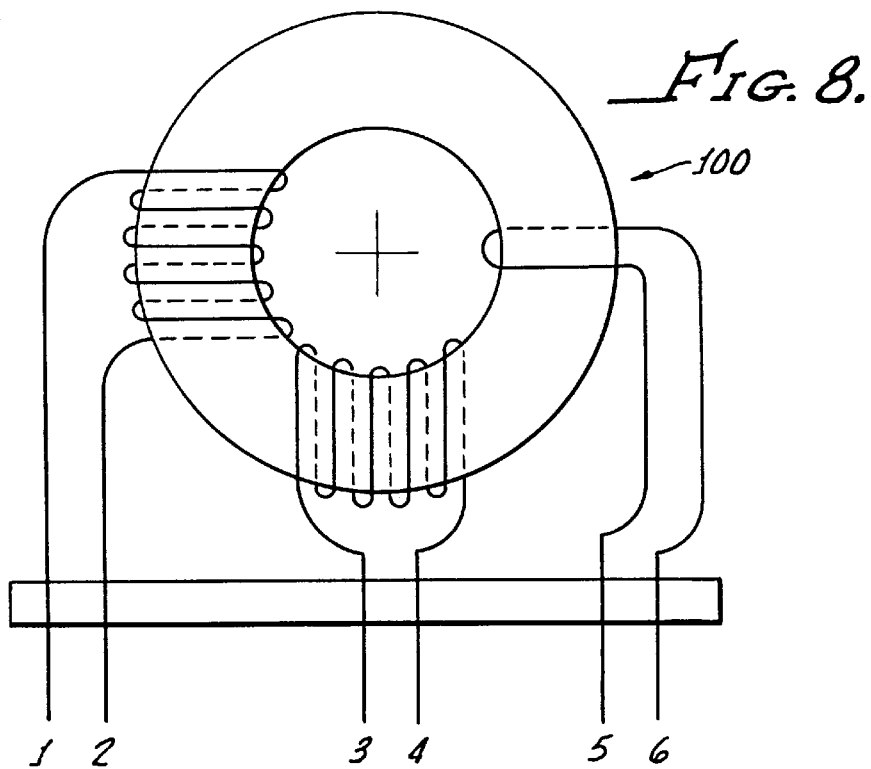
FIG. 8 is a drawing showing the transformer for the driver circuit in accordance with one aspect of the present invention.

The ballast circuit is provided on a printed circuit board which includes a ceramic thermal dissipating insulator to which is mounted the power switching transistors (see FIG. 6). The ceramic is preferably a non-iron ceramic, without any impurities, and without any magnetically inducible or magnetizable elements. The power switching transistors produce significant heat which is more easily dissipated by the ceramic. Each power switching transistor is attached to the ceramic plate by two dot solder joints onto the ceramic at attachment locations coated with a copper layer, or alternatively and preferably attached by an epoxy thermal conductive bond, typically used for heat sinks and the like. The circuit board and the ceramic plate or tape are inserted into a rectangular aluminum can and potted in asphalt, in the conventional manner. The asphalt assists in heat dissipation. The ceramic is preferably a Kyocera substrate tape, material code A-473T. The size of the plate or tape can be 0.800 inch by 2.700 inch, with the transistors mounted with an 0.850 inch center-to-center spacing.

FIG. 10A shows a configuration for connecting the ballast of the present invention. FIG. 10B shows a connection method for a preexisting 7-wire ballast, and FIG. 10C shows a method for connecting the ballast of the present invention to the cases to which the current 7-wire ballast is connected. FIG. 10C demonstrates that the ballast of the present invention can be substituted or retrofitted into the cases presently designed for and containing a 7-wire ballast. Specifically, one side of the anode for each lamp is commonly connected and coupled to one orange wire and one red wire from the ballast circuit.

It should be noted that the above are preferred configurations but others are foreseeable. The described embodiments of the invention are only considered to be preferred and illustrative of the inventive concept; the scope of the invention is not to be restricted to such embodiments. Various and numerous other arrangements may be devised by one skilled in the art without departing from the spirit and scope of the invention.

COMPONENT IDENTIFICATION LIST

| COMPONENT NAME | PART NO. | TYPE NAME | RATING | MANUFACTURE'S NAME |
|---|---|---|---|---|
| Bridge-Diode | BD1 | KBP206 RS206L-B | 600V 2A | E.I.C. RECTRON G.I. |
| Fast Recovery Diode | D1 | SM4935 SMBYT01-200 SE106 | 200V 1A | E.I.C. RECTRON G.I. |
| Fast Recovery Diode | D2 | UF4005 | 600V 1A | GI. MOTOROLA |
| DIAC | D3 | DB3 | 32V | SGS THOMSON |
| Zener Diode | D4-D5 | SM5Z18A, MLL5248B | 18V 500MW | SGS THOMSON Tritron |
| Diode | D6 | SM4006 BYD17G | 600V 1A | RECTRON |
| MOSFET | Q1-Q3 | IRF830 | 500V 3A 1.5Ω | SGS THOMSON International Rectifier |
| PFC-IC | U1 | SG3561 | 28V 500MA | LINFINITY |
| Capacitor: Metal-Film | Cx | 224/275 | 0.0022 $\mu$F 275 VAC | RIFA, WIMA, THOMSON |
| Capacitor: Metal-Paper | C1-2 | PME-271 | 0.0022 $\mu$F 250 VAC | RIFA, WIMA, THOMSON |
| Capacitor Metal-Poly-Film | C3 | MMW474EF | 0.47 $\mu$F 630 V | RUBYCON NICHICON PANASONIC |
| Ceramic Chip Capacitor | C4 | SMD1206 | 0.01 $\mu$F 50V | JOHANSON, AVX NOVACAP,MURATA |
| Eelectrolytic Capacitor | C5 | 25SSP101K UPR1E101MPH 1RX1E105M | 100 $\mu$F 25 V 105° C. | RUBYCON NICHICON SAMHWA |
| Ceramic Chip Capacitor | C6, C8, C13 | SMD1206 | 0.1 $\mu$F 50 V | JOHANSON,NOVACAP,AVX |
| Ceramic Chip Capacitor | C7 | SMD1206 | 0.047 $\mu$F 50 V | JOHANSON,NOVACAP,AVX |
| Ceramic Chip Capacitor | C9 | SMD1206 | 0.22 $\mu$F 50V 50 V | JOHANSON,NOVACAP,AVX |
| Ceramic Chip Capacitor | C10 | SMD1206 | 0.33 $\mu$F 50 V | JOHANSON,NOVACAP,AVX |
| Electrolytic | C12 | 350SSP33M 1RX2VAB476M | 33 $\mu$F 450V 105° C. | RUBICON,NICHICON, SAMWHA |
| Metal Poly | C14 | CF067G3334K | 0.33 $\mu$F 250 V | RUBICON, ITW, THOMSON |
| Metal Poly | C-16-17 | PHE428RB447 | 0.0047 1600V | THOMSON, RIFA, SAMWHA |
| Metal film Resistor | R1 | R1206 | 2MΩ 1/8W | ROHM,KOA,DALE |
| Metal film Resistor | R2 | R1206 | 12kΩ 1/8W | ROHM,KOA,DALE |
| Metal film Resistor | R3 | R1206 | 100KΩ 1/8W | ROHM,KOA,DALE |
| Metal film Resistor | R5 | R1206 | 1MΩ 1/8W | ROHM,KOA,DALE |
| Metal film Resistor | R6 | R1206 | 8.1KΩ 1/8W | ROHM,KOA,DALE |
| Metal film Resistor | R7, R8 | R1206 | 100KΩ 1/8W | ROHM,KOA,DALE |
| Metal film Resistor | R9 | R1206 | 15KΩ 1/8W | ROHM,KOA,DALE |
| Metal film Resistor | R10 | R1206 | 39KΩ 1/8W | ROHM,KOA,DALE |
| Metal film Resistor | R11 | R1206 | 3.9MΩ 1/8W | ROHM,KOA,DALE |
| Metal film Resistor | R12 | R1206 | 22Ω 1/8W | ROHM,KOA,DALE |
| Metal film Resistor | R13 | R1206 | 1KΩ 1/8W | ROHM,KOA,DALE |
| Metal film Resistor | R14 | Wire | 0.5Ω 1/2W | ROHM,KOA,DALE |
| Metal film Resistor | R16, R17 | R2010 | 120Ω 1/2W | ROHM,KOA,DALE |
| Metal film Resistor | R21 | R2010 | 470KΩ 1/2W | ROHM,KOA,DALE |
| Metal film Resistor | R22 | R2010 | 1.5KΩ 1/2W | ROHM,KOA,DALE |

What is claimed is:

1. A ballast for driving a fluorescent light source, the ballast comprising:

an input circuit;

an output circuit; and electronics having a plurality of components including switching transistors, the switching transistors being between the input and output circuits mounted on a ceramic heat sink and the other components of the electronics being mounted on at least one component support different from the ceramic heat sink.

2. The ballast of claim 1 wherein the ceramic is a low iron content ceramic.

3. A ballast circuit for driving a fluorescent light source, the ballast comprising:

an input circuit;

an output circuit; and a transformer having a permeability value higher at a temperature below zero degrees Celsius than a permeability at a temperature above twenty degrees Celsius.

4. The ballast circuit of claim 3 wherein the transformer is wound with wires having an insulation value of at least 100 degrees Celsius.

5. The ballast circuit of claim 4 wherein the wires for the transformer are insulated with an insulation value of approximately 200 degrees Celsius.

6. The ballast circuit of claim 3 wherein the transformer comprises a primary winding, a secondary winding and a tertiary winding.

7. The ballast circuit of claim 6 wherein the primary winding has a greater number of turns than the tertiary winding.

8. The ballast circuit of claim 6 wherein the secondary winding has a greater number of turns than the tertiary winding.

9. The ballast circuit of claim 6 wherein the primary winding and the secondary winding have an equal number of turns.

10. The ballast circuit of claim 3 wherein the transformer is formed with titanium.

11. The ballast circuit of claim 3 wherein the transformer is formed with tin.

12. The ballast circuit of claim 3 wherein the transformer is formed with ferrous oxide.

13. A ballast circuit for driving a fluorescent light source, the ballast comprising:

an input circuit;

an output circuit; and means coupled between the input and output circuits for providing a first voltage of operation to the output circuit at a first time and a second voltage to the output circuit at a second time.

14. The ballast circuit of claim 13 further comprising means between the input circuit and the output circuit for operating at a number of different voltages more than 40 volts apart.

15. The ballast circuit of claim 13 further comprising at least three transistors between the input and the output and means for operating the transistors wherein the three transistors can produce a desired voltage at an output for driving a lamp for a given range of input voltages applied to the input that include at least 110 volts and 220 volts.

16. A ballast circuit for driving a fluorescent light source, the ballast circuit comprising:

an input circuit;

a power circuit for providing a voltage signal to the light source at a desired voltage;

a drive circuit for producing an oscillating signal for driving the light source;

an output circuit for coupling the oscillating signal to the light source; and a signal element for reducing the voltage of operation upon startup of the ballast and for increasing the voltage of operation after startup.

17. The ballast circuit of claim 16 wherein the signal element is a feedback coupling to the power circuit to signal when the light source has become illuminated.

18. The ballast circuit of claim 16 wherein the signal element is a feedback coupling to the power circuit to signal when the drive circuit has begun oscillating.

* * * * *